United States Patent
Naka et al.

(10) Patent No.: US 6,905,998 B2
(45) Date of Patent: Jun. 14, 2005

(54) CATALYST PERFORMANCE RECOVERY METHOD FOR REFORMING CATALYST APPARATUS

(75) Inventors: Takahiro Naka, Utsunomiya (JP); Osamu Usaka, Utsunomiya (JP); Shoji Isobe, Dublin, OH (US); Yasushi Hiramatsu, Niigata (JP); Mikio Yoneoka, Niigata (JP)

(73) Assignees: Honda Giken Kogyo Kabushiki Kaisha, Tokyo (JP); Mitsubishi Gas Chemical Co., Inc., Tokyo (JP)

( * ) Notice: Subject to any disclaimer, the term of this patent is extended or adjusted under 35 U.S.C. 154(b) by 58 days.

(21) Appl. No.: 10/107,976

(22) Filed: Mar. 26, 2002

(65) Prior Publication Data

US 2002/0187890 A1 Dec. 12, 2002

(30) Foreign Application Priority Data

Mar. 28, 2001 (JP) .................................... P2001-092643

(51) Int. Cl.[7] ........................... B01J 20/34; B01J 38/12; C07C 1/00; C01B 3/24; C01B 3/26
(52) U.S. Cl. ........................ 502/38; 252/373; 423/650; 423/651; 423/652
(58) Field of Search ................. 252/373; 423/650–652; 502/38

(56) References Cited

U.S. PATENT DOCUMENTS

| 4,202,865 A | * | 5/1980 | Preston, Jr. ................ 423/244 |
| 4,208,397 A | * | 6/1980 | Coates ....................... 423/651 |
| 4,293,315 A | * | 10/1981 | Sederquist .................... 48/94 |
| 6,290,877 B2 | * | 9/2001 | Naka et al. .................. 252/373 |

FOREIGN PATENT DOCUMENTS

| JP | 03232701 A | * | 2/1990 | ............. B01J/8/04 |
| JP | 11079702 A | * | 3/1999 | ............ B01J/23/80 |
| WO | WO-01/00524 | * | 1/2001 | ............ C01B/3/40 |

* cited by examiner

*Primary Examiner*—Stanley S. Silverman
*Assistant Examiner*—Jonas N. Strickland
(74) *Attorney, Agent, or Firm*—Lahive & Cockfield, LLP; Anthony A. Laurentano, Esq.

(57) ABSTRACT

In a reforming catalyst apparatus provided with a reforming catalyst for forming a hydrogen rich reformed gas by a reforming reaction of the fuel with water, the catalyst performance can be recovered by heating the catalyst within a temperature ranging from 500° C. to 800° C. while supplying said fuel and air to the catalyst. This method allows recovery of the catalyst performance without demounting the catalyst from the reforming catalyst apparatus and allows providing the reforming catalyst with a long service life.

9 Claims, 7 Drawing Sheets

CATALYST PERFORMANCE RECOVERY METHOD FOR REFORMING CATALYST APPARATUS

BACKGROUND OF THE INVENTION

1. Field of the Invention

The present invention relates to a catalyst performance recovery method in a reforming catalyst apparatus for producing reformed gas containing hydrogen by reacting fuel such as alcohols and hydrocarbons with water, and in particular, to a catalyst performance recovery method in a reforming catalyst apparatus, which is capable of recovering the catalyst performing without demounting the catalyst from the reforming catalyst apparatus and which is capable of ensuring the long service life of the reforming catalyst apparatus.

2. Description of the Related Art

A reforming catalyst apparatus for obtaining a reformed gas containing hydrogen by reacting a fuel including alcohol such as methanol with water on a catalyst by a steam reforming reaction is conventionally known. A fuel cell system which carries out power generation based on the electrochemical reaction by supplying the reformed gas including hydrogen, obtained in the reforming catalyst apparatus, and an oxidizing agent such as air, is also conventionally known.

In the reforming catalyst apparatus, performance of the catalyst has been recovered by replacing the catalyst to a brand-new catalyst when the catalyst has been degraded and the reforming efficiency of the catalyst has been lowered.

However, when the reforming catalyst apparatus is integrated in a complex system, frequent replacement of the catalyst is not easy and the recovery of the catalyst performance has not been easy. Accordingly, the reforming performance of the reforming catalyst apparatus thereby depends on the durability of the catalyst.

In particular, regarding a fuel cell vehicle, in which a fuel cell is installed, it is particularly difficult to unload the catalyst from the reforming catalyst apparatus. Generally, the fuel cell installed on the fuel cell vehicle is normally required to tolerate to hard driving conditions. Thus, in the fuel cell system, the short service life of the fuel cell causes a serious problem.

Japanese Unexamined Patent Application, First Publication No. 11-79702 discloses a method to supply air to the reforming catalyst when the reforming catalyst reaches a predetermined degradation degree, in order to recover the catalyst performance without demounting the catalyst from the reforming catalyst apparatus. However, when air is supplied to the reforming catalyst for activating and recovering the catalyst, a problem sometime arises that the reforming catalyst is deteriorated by oxidization with air.

SUMMARY OF THE INVENTION

An object of the present invention is to provide a catalyst performance recovering method, capable of recovering the catalyst performance without demounting the catalyst from the reforming catalyst apparatus.

The present invention provides a catalyst performance recovery method for a reforming catalyst apparatus including a reforming catalyst used for generating a hydrogen rich reform gas by a reaction of a fuel with water, wherein the catalyst performance is recovered by heating the catalyst within a temperature ranging from above 500° C. to below 800° C. while supplying the fuel and air to the catalyst.

The above method makes it possible to reduce the reforming catalyst by heating at a temperature between above 500° C. and below 800° C. while supplying the fuel. The performance of the reforming catalyst is recovered to the level when it was new by the above-described reduction process.

In the above catalyst performance recovery method for a reforming catalyst apparatus, the reforming catalyst apparatus comprising a measuring device for obtaining information indicating a performance of the catalyst in the reforming catalyst apparatus and a control device for controlling supply amounts of the fuel and air based on a determination with respect to the catalyst performance obtained from information indicating the catalyst performance. In the above reforming catalyst apparatus, it is possible to continuously monitor the catalyst performance and to automatically recover the performance of the reforming catalyst, when information indicates that the catalyst is deteriorated.

In the above catalyst performance recovery method, wherein the measuring device (for example, the temperature sensor 6 in the embodiment) obtains a catalyst temperature and the control device (for example, the controller 7 in the embodiment) determines whether the catalyst performance is deteriorated based on the catalyst temperature obtained by the measuring device, deterioration of the catalyst can be determined by the catalyst temperature, so that the performance of the reforming catalyst can be recovered automatically when the catalyst temperature indicates that the catalyst has been deteriorated.

In the above catalyst performance recovery method, wherein a measuring device (for example, the gas sensor 19 in the embodiment) measures a composition of the reformed gas formed by the reforming catalyst and a control device (for example, the controller 10 in the embodiment) determines whether the catalyst performance is deteriorated based on said composition obtained by said measuring device, so that the performance of the reforming catalyst can be recovered automatically when the reformed gas composition indicates that the catalyst is deteriorated.

In the above catalyst performance recovery method, the measuring device (for example, a voltmeter 20 in the embodiment) measures a generation voltage generated by a fuel cell by use of the reformed gas formed by said catalyst and an oxidant gas and a control device determines whether the catalyst performance is deteriorated based on the generation voltage obtained by the measuring device, so that the performance of the reforming catalyst can be recovered automatically when the reformed gas composition indicates that the catalyst is deteriorated.

In the catalyst performance recovery method, when it is determined that the catalyst has been deteriorated, the control device controls supply amounts of the fuel and air such that the catalyst temperature is maintained at a temperature within a range above 500° C. and below 800° C. for less than 10 minutes, in order to recover the catalyst performance. Since the recovery operation of the reforming catalyst is limited to less than 10 minutes, the thermal degradation of the reforming catalyst can be minimized.

In the above catalyst performance recovery method, when a palladium type reforming catalyst is used as the reforming catalyst, the reforming catalyst temperature is increased to a temperature within a range above 560° C. and below 800° C. for less than 10 minutes, in order to recover the reforming catalyst performance.

In the above catalyst performance recovery method, when a copper type reforming catalyst is used as the reforming catalyst, the catalyst temperature is increased to a temperature range from above 500° C. to below 700° C. for less than 10 minutes.

DETAILED DESCRIPTION OF THE INVENTION

Hereinafter, embodiments of the present invention are described with reference to attached drawings.

First Embodiment

Figure 1:
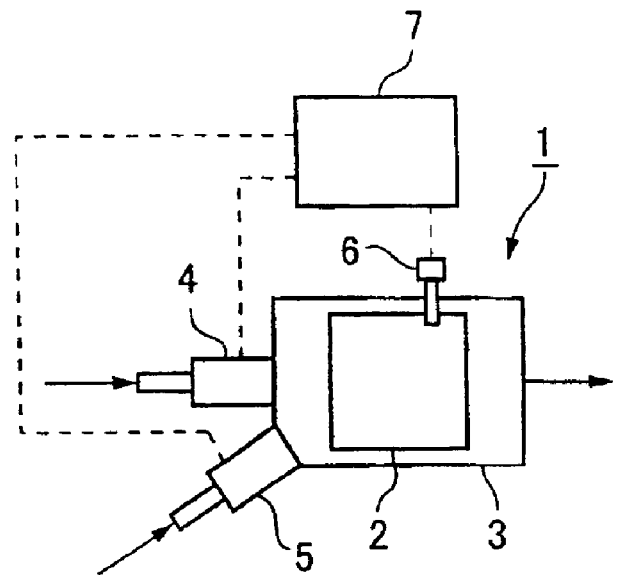
FIG. 1 is a diagram showing a schematic structure of one example of reforming catalyst apparatus according to the present invention.
Figure 2:
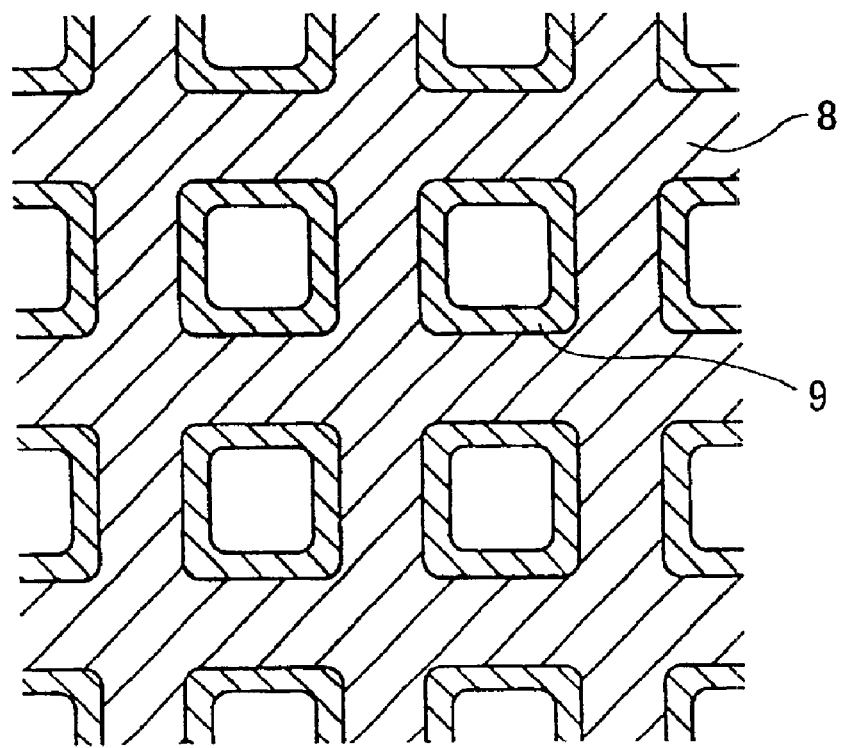
FIG. 2 is a cross-sectional view showing an example of a reforming catalyst layer of the reforming catalyst apparatus according to the present invention.

FIG. 1 is a diagram showing a schematic structure of one example of reforming catalyst apparatus according to the present invention. The reforming catalyst apparatus 1, which includes a reforming catalyst layer 2 composed of reforming catalysts, comprises a reforming device 3, for reforming a hydrogen rich reformed gas from a fuel and water by the reforming reaction using a reforming catalyst, a fuel introducing device 4 capable of introducing fuel and water to the reforming device 3, an air introducing device 5 capable of introducing air into the reforming device 3, a temperature sensor 6 (measuring device) for measuring the temperature of the reforming catalyst layer 2, a controller (control device) 7, connected electrically with the fuel introducing device 5 and temperature sensor 6.

Examples of the aforementioned catalysts include a copper type reforming catalyst carried by a metal oxide and a noble metal type catalyst carried by the metal oxide. Examples of noble metals in the noble metal type include gold, silver, and platinum group metals (palladium, platinum, ruthenium, rhodium, osmium, and iridium). These noble metals can be used alone or in combination of two or more.

Examples of applicable catalyst carrier metal oxides includes, for example, zinc oxide (ZnO), aluminum oxide ($Al_2O_3$), silicon dioxide ($SiO_2$), and titanium oxide ($TiO_2$).

Although the forms of the carrier carrying the catalyst such as the copper type reforming catalyst or the noble metal type reforming catalyst by the metal oxide are not limited, a general form of carrying the copper type catalyst and the noble metal type catalyst is to attach fine particles of these catalysts on the surfaces of the metal oxide particles.

Although not particularly limited, there are several forms of the reforming catalyst compacts, one of which is a pellet-type form obtained by forming reforming catalyst particles into pellets, and the other one of which is a honeycomb-type form obtained by coating paste of the reforming catalyst 9 on a surface of honeycomb-shape monolithic compact 8. Among the above forms, the honeycomb type form is the most preferable because the reforming reaction can be proceeded homogeneously and efficiently.

There is no particular limitation in the fuel introducing device 4 and the air introducing device 5 as long as they can introduce fuel, air, and water into the reforming device 3, and known injection pumps such as an injector or a nozzle injector are used.

There is no particular limitation in selecting a temperature sensor 6, and any temperature sensors normally used in the industrial fields or for the automotive control system may be used, and it is preferable to use a thermistor or a thermocouple in this application.

The controller 7 is used for controlling the supply amounts of fuel and water introduced from the fuel introducing device 4 and a supply amount of air introduced through the air introducing device 5 depending upon the catalyst performance determined based on information from the temperature sensor 6. Note that it is possible to use not only a controller 7 which is constituted by an exclusive hardware, but also a controller which is constructed by a memory and a central processing unit (CPU) and which executes a control operation by loading a program on the memory for realizing the function of the controller 7.

Figure 3:
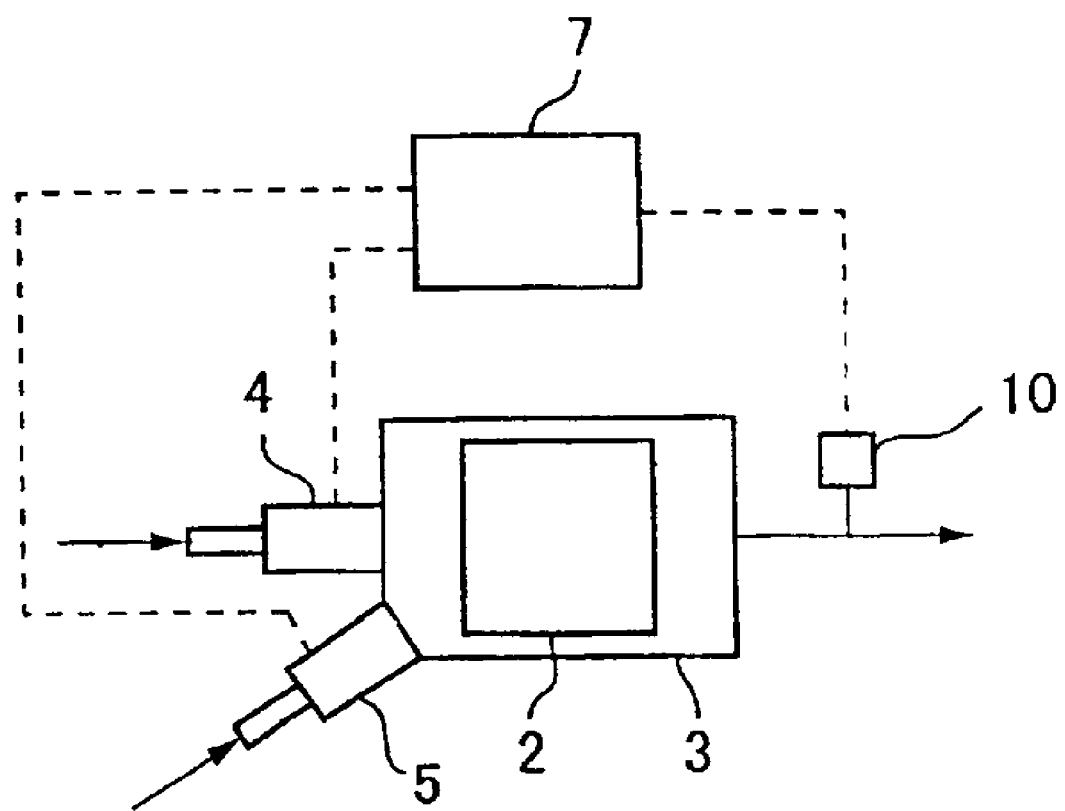
FIG. 3 is a diagram showing a schematic structure of the other example of reforming catalyst apparatus according to the present invention.

In the present embodiment, although the temperature sensor 6 is used for detecting the performance of the catalyst, the detecting device is not limited to the temperature sensor. For example, as shown in FIG. 3, the performance of the catalyst may be detected by a device such as a gas sensor 10 disposed downstream of the reforming device 3.

The reforming operation of the fuel by the use of this reforming catalyst apparatus 1 is performed as follows.

First, the fuel and water introduced into the reforming catalyst apparatus 3 through the fuel introducing device 4 is reformed into a hydrogen-rich reformed gas by the reforming reaction by contacting with the reforming catalyst on reforming catalyst layer 2, and the reformed gas is exhausted from the reforming device 3.

Generally, the fuel and water to be introduced into the reforming catalyst apparatus is supplied in vaporized state by the vaporizer (not shown).

Various alcohols such as methanol and ethanol may be used, and normally methanol is preferably used. Various hydrocarbons such as gasoline, methane, and propane are also used as the fuel.

It is preferable to maintain the temperature of the reforming catalyst layer during the reforming operation within a temperature range of 300 to 800° C. Examples of heating the reforming catalyst layer 2 include a method (auto-thermal method) of heating the reforming catalyst layer 2 by introducing a small amount of air through the air introducing device 4 and by combusting a part of the alcohol or hydrocarbon, which are fuels, with oxygen in air.

Next, a reforming operation in the reforming catalyst apparatus 1 is described below.

During the aforementioned reforming operation, the temperature sensor 6 always detects the temperature of the reforming catalyst layer 2. When it is determined by the controller that the reforming catalyst layer 2 has been deteriorated because the temperature of the reforming catalyst layer 2 exceeds a predetermined temperature, introduction of water from the fuel introducing device 4 is stopped and only the fuel is introduced into the fuel introducing device 4 and air is introduced by the air introducing device from the air introducing device 5.

When the fuel and air are in contact with the reforming catalyst layer 2, combustion of the fuel and air starts and the temperature of the reforming layer rises to a temperature at which a reduction reaction of the reforming catalyst takes place, that is, 500° C.

When the fuel and air are in contact with the reforming catalyst layer 2, which is heated to 500° C. or more, the performance of the reforming catalyst recovers according to the following equation, when, for example, a palladium catalyst is used as the reforming catalyst, and methanol is used as the fuel.

$$PdO+CH_3OH=Pd+CO_2+2H_2$$

Figure 4:
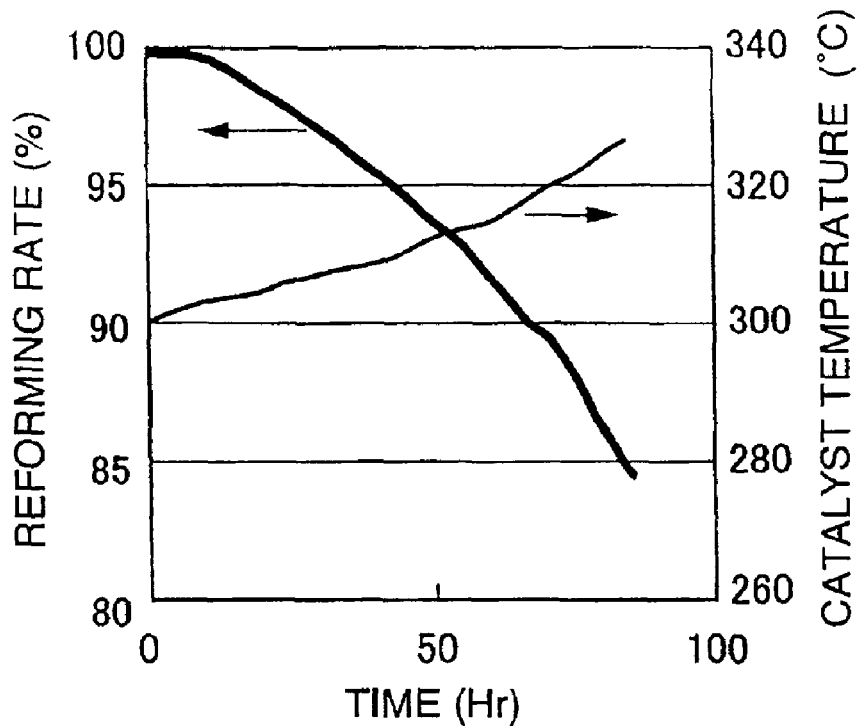
FIG. 4 is a graph showing the reforming rate and the time dependent change of the catalyst temperature during reforming operation by use of a copper type reforming catalyst.
Figure 5:
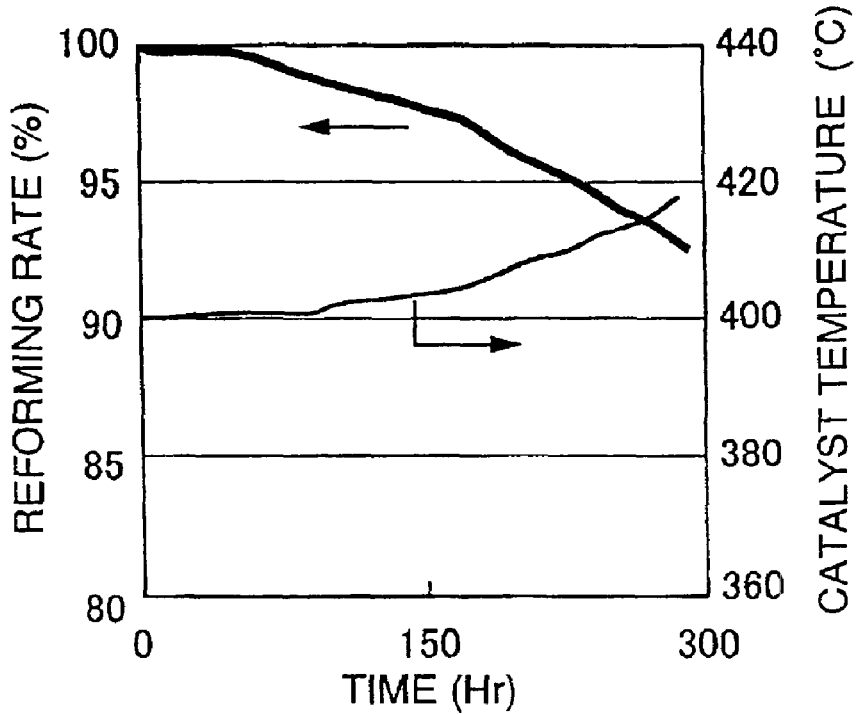
FIG. 5 is a graph showing the reforming rate and the time dependent change of the catalyst temperature during reforming operation by use of a palladium type reforming catalyst.

FIG. 4 is a graph showing the time dependent changes of the reforming rate and the catalyst temperature during the reforming operation when the copper type reforming catalyst is used, which is described in the latter embodiment. FIG. 5 is a graph showing the time dependent changes of the reforming rate and the catalyst temperature during the reforming operation when the palladium type reforming catalyst is used, which is described in the latter embodiment. Here, the reforming rate means the ratio of change of methanol and the reforming rate is obtained by the following equation.

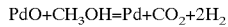

Reforming rate $(\%) = \{1-[CH_3OH]/([CO]+[CO_2]+[CH_3OH])\} \times 100$

A correlation between a temperature rise of the reforming catalyst and degradation of the catalyst performance is found. Thus, it is possible to determine that the catalyst performance is lowered such that the reforming catalyst cannot be used more when a temperature of a reforming catalyst 2 reaches a predetermined temperature.

The reason for the temperature rise of the reforming catalyst occurring with the degradation of the catalyst performance, that is, deterioration of the reforming catalyst, is assumed to be as follows.

When the reforming catalyst deteriorates, the reaction rate of the reforming reaction is reduced. Since the steam reforming reaction by the fuel and water is an endothermic reaction, it is assumed that reduction of the reaction rate causes reduction of endothermic energy and thereby the temperature of the reforming catalyst increases.

The predetermined temperature for determining the degradation of the reforming catalyst is suitably determined, without limitation, depending on a type of the reforming catalyst and a performance required for the reforming catalyst device.

In the case that it is determined that the performance of the catalyst has been degraded when the reforming rate is reduced to 95%, the aforementioned predetermined temperature is set to 310° C. for the copper type reforming catalyst shown in FIG. 4, and the predetermined temperature is set to 410° C. for the palladium type reforming catalyst shown in FIG. 5.

The temperatures during the recovery operation is set within a range of above 500° C. to below 800° C. If the temperature during the recovery operation is below 500° C., the recovery of the catalyst performance becomes insufficient. If the temperature of the recovery operation is above 800° C., the reforming catalyst may not be recovered but may be deteriorated. The temperature range for recovery of the catalyst performance lies preferably within the range of 500° C. to 650° C.

A period of time for maintaining the temperature of the reforming catalyst in the aforementioned temperature range, that is, the recovery operation time is preferably less than 10 minutes. If the recovery operation exceeds 10 minutes, there is a possibility that the reforming catalyst be deteriorated. Thus, the preferable recovery operation time is within a range of 1 to 10 minutes.

The temperature of the reforming catalyst during recovery operation and the recovery operation time must be determined appropriately depending on the type of the reforming catalyst, degree of degradation of the reforming catalyst, and types of fuels, and it is desired to determine the optimum time of the recovery operation in advance by, for example, preliminary experiments.

In the catalyst performance recovery method of the reforming catalyst device 1, since the fuel and air are supplied to the reforming catalyst 2 during recovery operation, the temperature of the reforming catalyst can be elevated to a high temperature within a temperature range of 500° C. to 800° C. by combustion of the fuel such that the reforming catalyst can be reduced by the fuel in the high temperature range. The reforming catalyst after reduction is recovered and exhibits a catalytic function, which is similar to the new catalyst.

In contrast, when only air is supplied to the reforming catalyst during recovery operation held at a high temperature, the performance of the reforming catalyst is not recovered and the reforming catalyst shows no significant change. That is, recovery of the reforming catalyst observed when the fuel and air is supplied is not performed by the oxidation reaction by air, but the reduction reaction taken place when the catalyst is exposed to the high temperature atmosphere including the fuel gas.

Note that although the degradation of the performance of the reforming catalyst is determined by detecting the temperature of the reforming catalyst 2 by the temperature sensor 6, the method of determining the degradation of the catalyst performance is not limited to the above temperature measurement. As shown in FIG. 3, it is also possible to detect the catalyst performance by reduction of hydrogen or an increase of carbon monoxide through measurement of the composition of the reformed gas by a gas sensor 10.

Second Embodiment

Next, an embodiment, in which the reforming catalyst device 1 of the first embodiment is applied to a fuel cell vehicle, is explained with reference to drawings.

Figure 6:
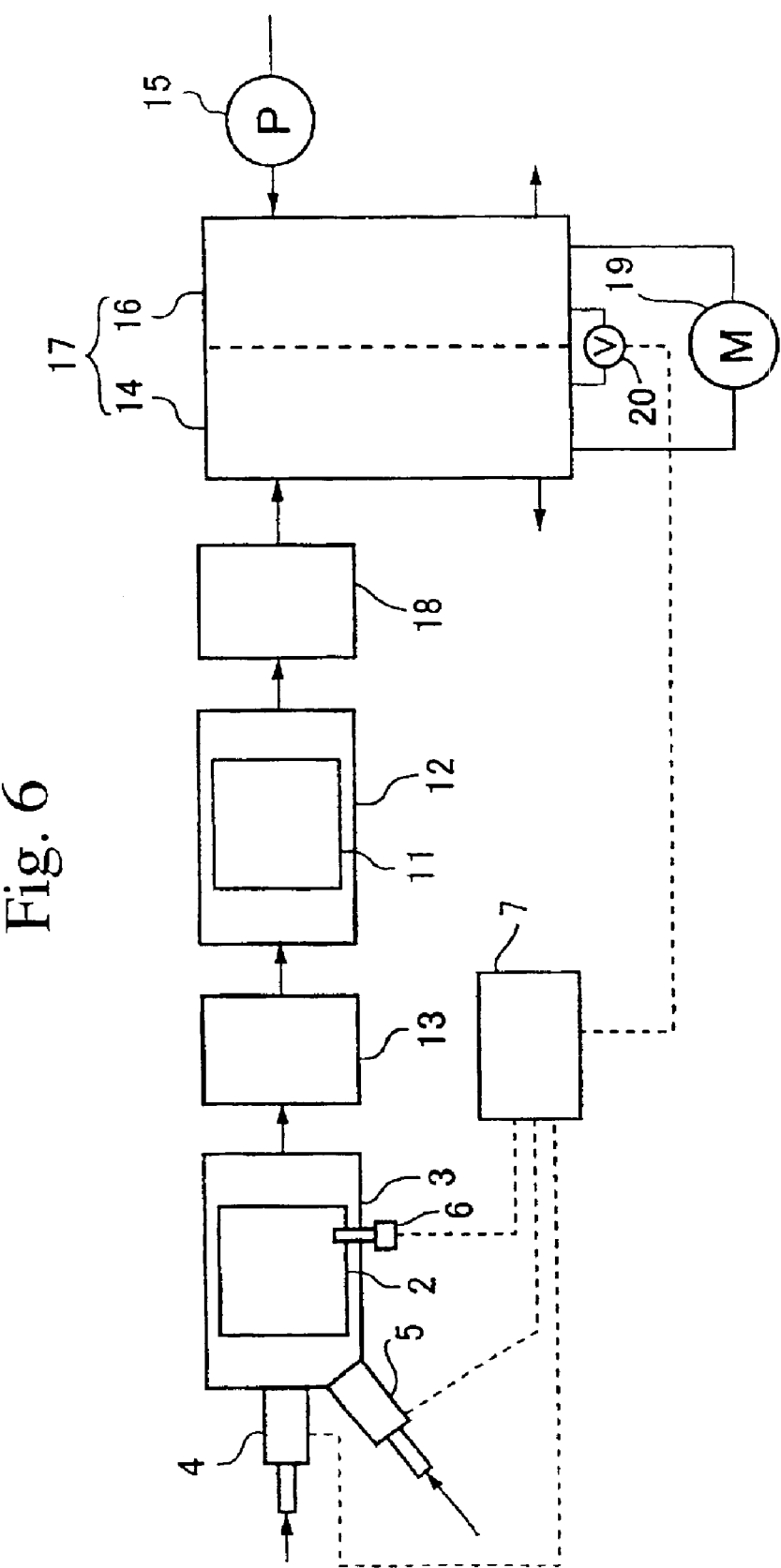
FIG. 6 is a diagram showing a schematic structure of one fuel cell system in a fuel cell vehicle, to which a reforming catalyst apparatus is applied.

FIG. 6 is a schematic diagram showing the structure of a fuel cell system in which a reforming catalyst device of the second embodiment is applied to a fuel cell vehicle.

The fuel cell system comprises a reforming catalyst layer 2 including a reforming catalyst, a reforming device 3 for forming a hydrogen-rich reformed gas from a fuel and water by the reforming reaction using a reforming catalyst, a fuel introducing device 4 for introducing a fuel and water into the reforming device 3, an air introducing device 5 for introducing air into the reforming device 3, and a selective oxidizing catalyst layer 11 including the selective oxidizing catalyst; and the fuel cell system further comprises a selective oxidizing device 12 for oxidizing carbon monoxide in the reforming gas into carbon dioxide by a selective oxidizing reaction using the selective oxidizing catalyst, a heat exchanger 13 for reducing a temperature of reformed gas exhausted from the reforming device 3 to a low temperature appropriate for introducing the reformed gas into the selective oxidizing device 12, a fuel cell 17 comprising an anode electrode 14 to which the reformed gas after being oxidized selectively is introduced and a cathode electrode 16 to which air is introduced from a pump 15, and a heat exchanger 18 for reducing the temperature of the reformed gas exhausted from the selective oxidizing device 12 after selective oxidization to a temperature appropriate to be introduced into the fuel cell 17.

Examples of the aforementioned selective oxidizing catalyst include a ruthenium system catalyst, a platinum catalyst, and catalysts including platinum. It is preferable for the selective oxidizing catalyst to be carried on the surface of thermally stable metal oxides from the point of view of suppressing the thermal deterioration. Examples of preferable metal oxide carriers include aluminum oxide (alumina, $Al_2O_3$), silicon dioxide (silica, $SiO_2$), and titanium oxide ($TiO_2$).

Although the form of the selective oxidizing catalyst layer 11 is not limited, preferable forms are, for example, a pellet form or the aforementioned honeycomb form. In particular, the honeycomb type catalyst layer is preferable from the point of view that the selective oxidizing reaction proceeds homogeneously and efficiently.

The aforementioned fuel cell system generates power in the following manner.

The fuel and water introduced into the reforming device 3 through the fuel introducing device 4 is reformed into a hydrogen-rich reformed gas by the reforming reaction by contacting with the surface of the reforming catalyst. The reformed gas, after being cooled by the heat exchanger 13 to a temperature, specifically within a temperature range from 100 to 300° C., which is appropriate for being introduced into the selective oxidizing device 12, is introduced into the selective oxidizing device 12. A part of the carbon monoxide in the reformed gas after being introduced into the selective oxidizing device 12 is oxidized into carbon dioxide by the selective oxidizing catalyst on a surface of the selective oxidizing catalyst layer 11.

The reformed gas, after the carbon monoxide concentration is reduced by the selective oxidization, is cooled by the heat exchanger 18 below the temperature appropriate for being supplied to the fuel cell 17, that is, a specific temperature within a temperature range of room temperature to 80° C., and is supplied to the anode electrode 17 side of the fuel cell 17.

In contrast, air is supplied through the pump 15 to the cathode electrode 16 side of the fuel cell 17 as an oxidizing gas.

In the fuel cell 17, hydrogen in the reformed gas supplied to the anode electrode 14 side and oxygen in air supplied to the cathode electrode 16 side cause an electrochemical reaction for conducting power generation. The electric power obtained by power generation is supplied to a motor in the fuel cell vehicle.

The reformed gas supplied to the anode electrode 14 side of the fuel cell 17 is, after being served in power generation, exhausted as the exhaust gas from the anode electrode 14. In addition, air is exhausted from the cathode electrode 16 after being used in power generation.

Next, the recovery operation of the reforming catalyst is described.

During power generation, a temperature sensor 6 always detects the temperature of the reforming catalyst 2. When it is determined by the control device 7 that the catalyst has been deteriorated, by detecting the temperature of the reforming catalyst exceeding a predetermined temperature, introduction of water through the fuel introducing device 4 is stopped and only the fuel is introduced through the fuel supply device 4 and air is supplied through the air introducing device 5.

When the fuel and air are in contact with the reforming catalyst layer 2, which is heated to a temperature to be able to execute the reforming reaction, the fuel burns and the temperature of the reforming catalyst 2 rises above the temperature, wherein the reduction reaction of the reforming catalyst takes place, that is, 500° C.

When the fuel is in contact with the reforming catalyst, which is heated over 500° C., a reduction reaction of the metal which forms the reforming catalyst takes place and the performance of the reforming catalyst recovers.

Note that although the temperature sensor 6 is used in this embodiment as a device for detecting the performance of the reforming catalyst, the detecting device is not limited to the temperature sensor 6. For example, a voltage meter 20 provided in the fuel cell 17 may be used as a detecting device for evaluating the performance of the catalyst.

The performance of the catalyst is determined by a method of measuring the generated voltage of the fuel cell 17 using a voltage meter 20 for detecting the voltage drop of the fuel cell, which represents deterioration of catalyst performance. This voltage drop is related to poisoning of the catalyst at the anode 14 of the fuel cell 17 by increasing the amount of carbon monoxide due to deterioration of the reforming catalyst.

EXAMPLES

The present invention will be explained in detail using the examples below.

Preparation of the Copper Type Reforming Catalyst

Copper nitrate, zinc nitrate, and aluminum nitrate were mixed and dissolved in water by metal atomic ratios of 1.3:1.0:0.02 and a solution of 5% by weight was obtained. A 5 weight % sodium hydrogencarbonate solution was dropped in the nitrate solution while heating the nitrate solution at 50° C. and a coprecipitate was obtained. After the coprecipitate was washed with water and was dried, and the coprecipitate was fired at 400° C. in air for two hours and a copper type catalyst powder was obtained. A catalyst slurry was obtained by mixing the copper type catalyst powder with an appropriate amount of alumina-sol and water. A honeycomb made of cordierite was immersed in the catalyst slurry and the catalyst slurry was coated on the cordierite honeycomb. The coated honeycomb is dried and fired at 400° C., which is used as an example for further experiments.

Preparation of the Palladium Type Reforming Catalyst

Dinitrodiamminepalladium and zinc oxide were mixed and dissolved in water with a metal atomic ratio of 1:9 and a solution was obtained containing 5 weight % of palladium. While heating this solution at 50° C., 5 weight % solution of a 5 weight % sodium hydrogencarbonate solution was dropped in the nitrate solution and a coprecipitate was obtained. After the coprecipitate was washed by water, dried, and the coprecipitate was fired to 600° C. and a 5 weight % sodium hydrogencarbonate solution was dropped in the nitrate solution while heating the nitrate solution to 50° C. and coprecipitate was obtained. After the coprecipitate was washed with water, and was dried, the coprecipitate was fired in air for two hours and a copper type catalyst powder was obtained. A catalyst slurry was obtained by mixing the copper type catalyst powder with an appropriate amount of alumina-sol and water. A honeycomb made of cordierite was immersed in the catalyst slurry and the catalyst slurry was coated on the cordierite honeycomb. The coated honeycomb was dried and fired at 600° C. in air for two hours and a noble metal type catalyst powder was obtained. A catalyst slurry was obtained by mixing the copper type catalyst powder with an appropriate amount of alumina-sol and water. A honeycomb made of cordierite was immersed in the catalyst slurry and the catalyst slurry was carried by the cordierite honeycomb. The coated honeycomb is dried and fired at 400° C., which is used as an example for further experiment.

Example 1

Time Dependent Changes of the Reforming Rate and the Catalyst Temperature

A reforming operation was conducted using the aforementioned copper type catalyst layer under the conditions described below and the reforming rate and the change of the catalyst temperature over time were measured. The results are shown in FIG. 4.

Reforming conditions: A reforming operation of a mixed fuel of water and alcohol by the auto-thermal method was conducted at a ratio of S/C=1.5 (steam/carbon: molar ratio), methanol LHSV=15, and the inlet gas temperature to the reforming catalyst is 180° C. Immediately after starting the reforming operation, an initial amount of adding air is adjusted so as to obtain a reforming rate of 99%. While maintaining the initial amount of adding air, the reforming operation was proceeded, and the reforming rate of methanol and the change of catalyst temperature with time were detected.

The specification of the catalyst layer: a cordierite honeycomb with 400 cells, 45 mm in diameter an 25 mm in height; the amount of catalyst carried by the honeycomb was 200 g/l.

Recovery Operation of the Reforming Catalyst

Figure 7:
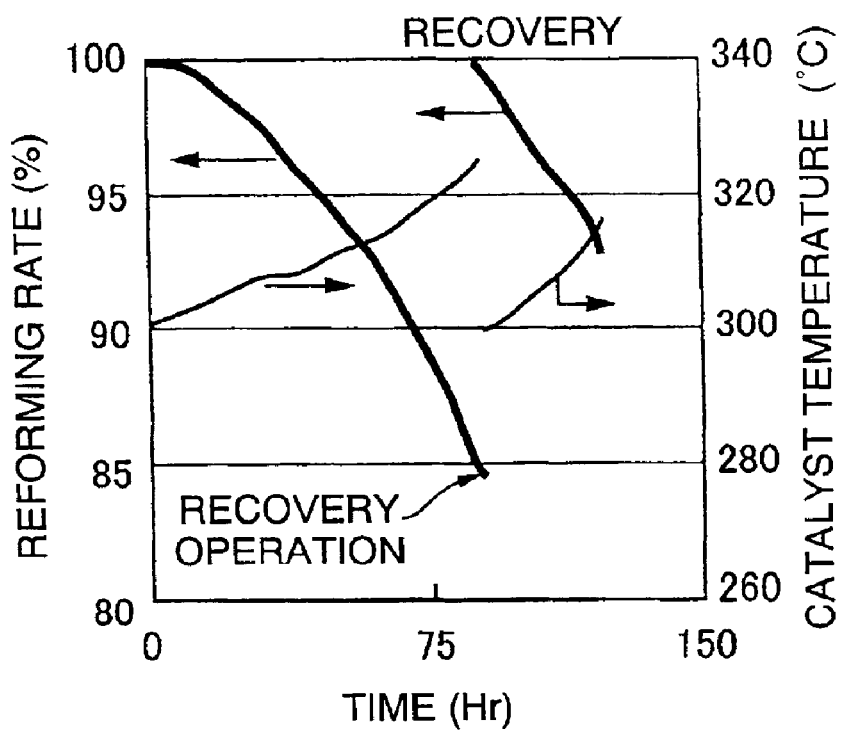
FIG. 7 is a graph showing the reforming rate and the time dependent change of the catalyst temperature before and after entering into a recovery operation during reforming operation.

The recovery operation was carried out under conditions shown below when the temperature of the catalyst reached 325° C. The results of the recovery operation are shown in FIG. 7.

Recovery conditions: An amount of air is supplied to attain the catalyst temperature of 600° C. and this temperature was maintained for one minute, under conditions of methanol LHSV=5 and S/C=1.5. After the recovery operation, the time dependent changes of the reforming rate and the catalyst temperature were measured.

Example 2

Time Dependent Change of the Reforming Rate and the Catalyst Temperature

The reforming operations are conducted using the aforementioned palladium type reforming catalyst layer under the same conditions as those of Example 1, and the time dependent changes of the reforming rate and the catalyst temperature were observed. The results are shown in FIG. 5.

Recovery Operation of the Reforming Catalyst

Figure 8:
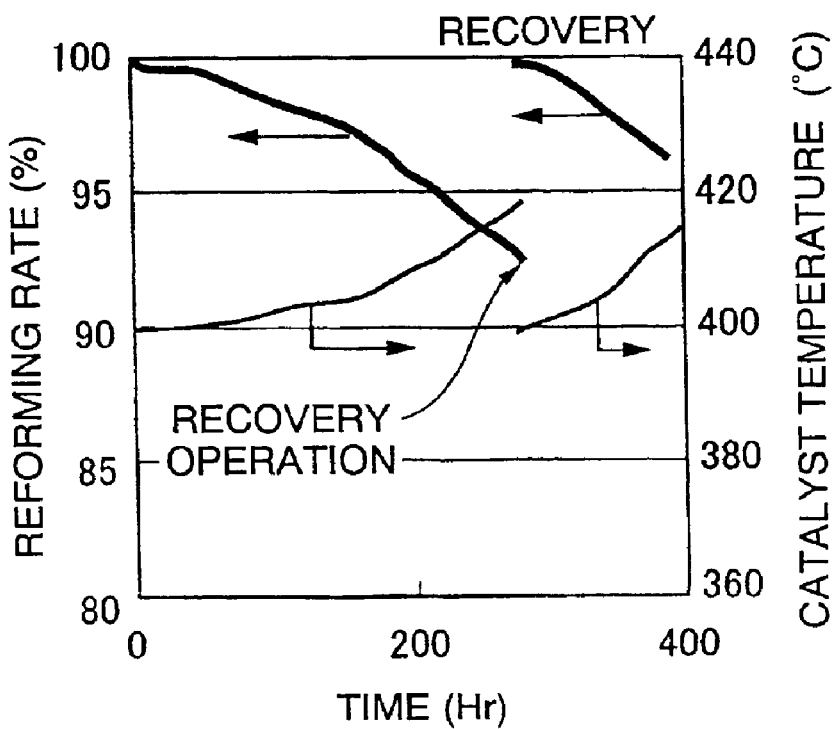
FIG. 8 is a graph showing the reforming rate and the time dependent change of the catalyst temperature before and after entering into a recovery operation when a copper type reforming catalyst is used.

When the catalyst temperature reached 420° C., the recovery operation was conducted under same conditions as those of Example 1. The results are shown on FIG. 8.

It was observed that the recovery operation made it possible to recover both the reforming rate and the catalyst temperature of the copper type reforming catalyst as well as the palladium type reforming catalyst to their initial states.

Example 3

Catalyst Temperature During Recovery Operation

Figure 9:
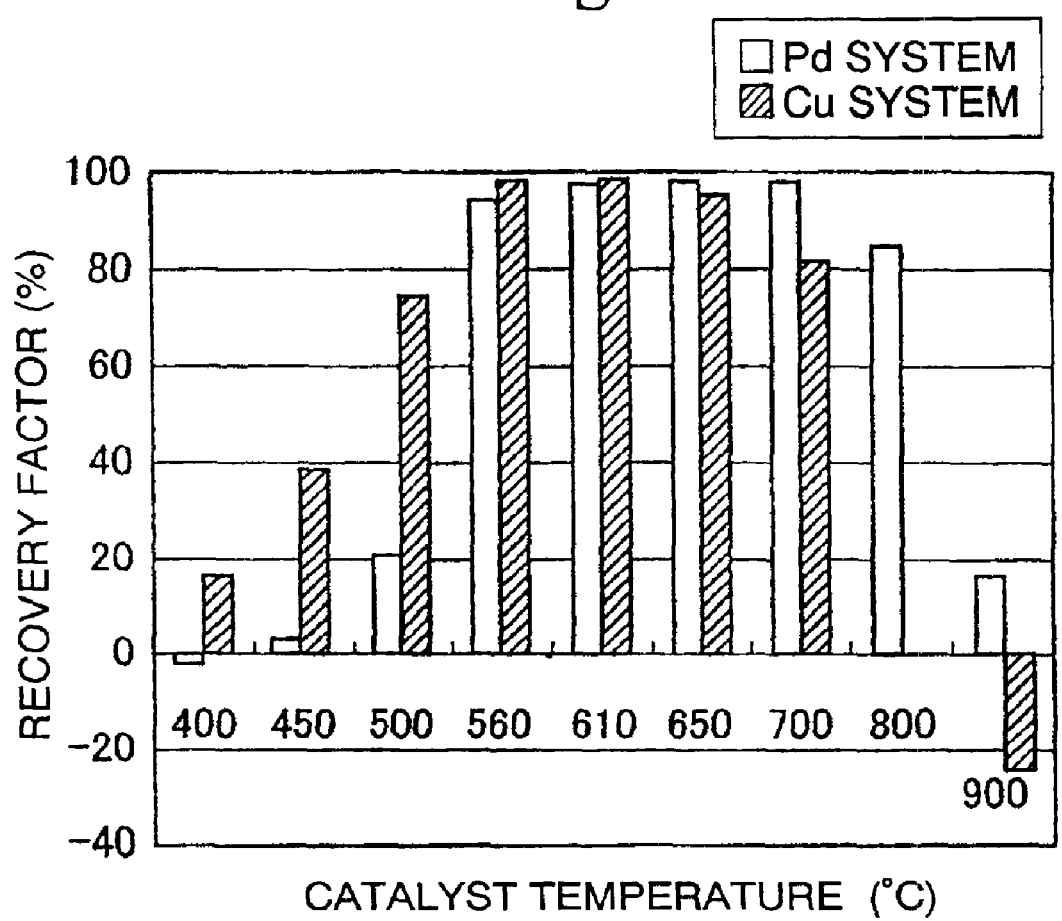
FIG. 9 is a graph showing a relationship between the recovery factor of the reforming catalyst by the recovery operation and the catalyst temperature during the time of recovery operation.

The catalyst temperatures of the recovery operations in Examples 1 and 2 were changed, and changes of the recovery factor were measured. The results were shown in FIG. 9.

The recovery factor is expressed as follows.

The recovery factor=[reforming rate after recovery operation-reforming rate before recovery operation]/(reforming rate before recover operation-reforming rate just before recovery operation)

The maximum temperature during the recover operation is assigned as the catalyst temperature. The reforming rate after the recovery operation was measured after free cooling of the catalyst to room temperature.

It was observed that the remarkable recovery of the catalyst performance for both the copper type reforming catalyst and the palladium type reforming catalyst were observed when the catalyst temperature during the recovery operation was raised above 500° C.

Example 4

Recovery Operation Time of the Copper Type Reforming Catalyst

Figure 10:
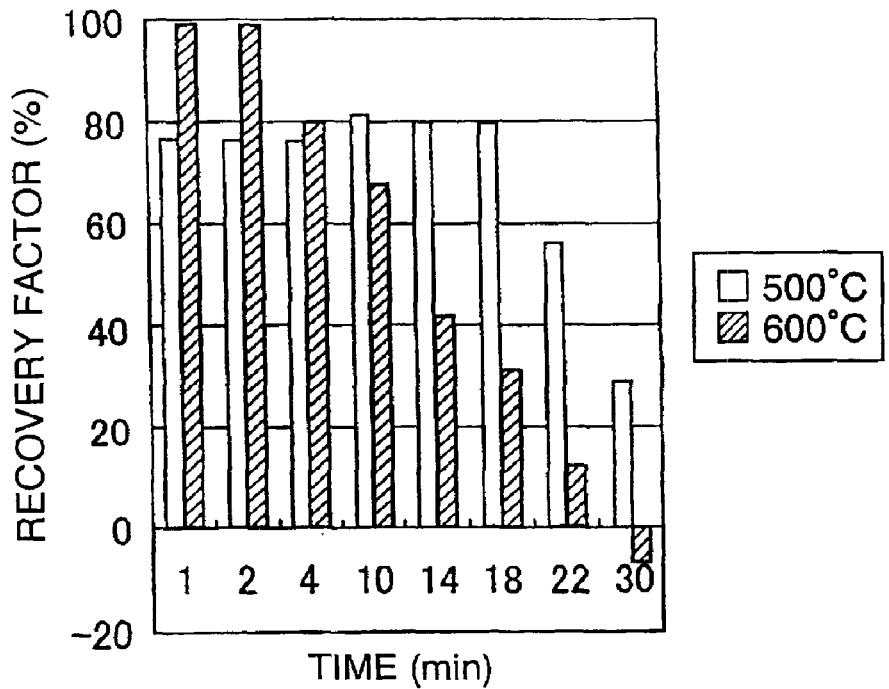
FIG. 10 is a graph showing the relationship between a recovery factor of the copper type reforming catalyst by the recovery operation and time of the recovery operation.

The catalyst temperature during the recovery operation in Example 2 was set at 500° C. or at 600° C., and time dependent change of the reforming rate was measured with the passage of time. The results are shown in FIG. 10.

Example 5

Recovery Operation Time of the Palladium Type Reforming Catalyst

Figure 11:
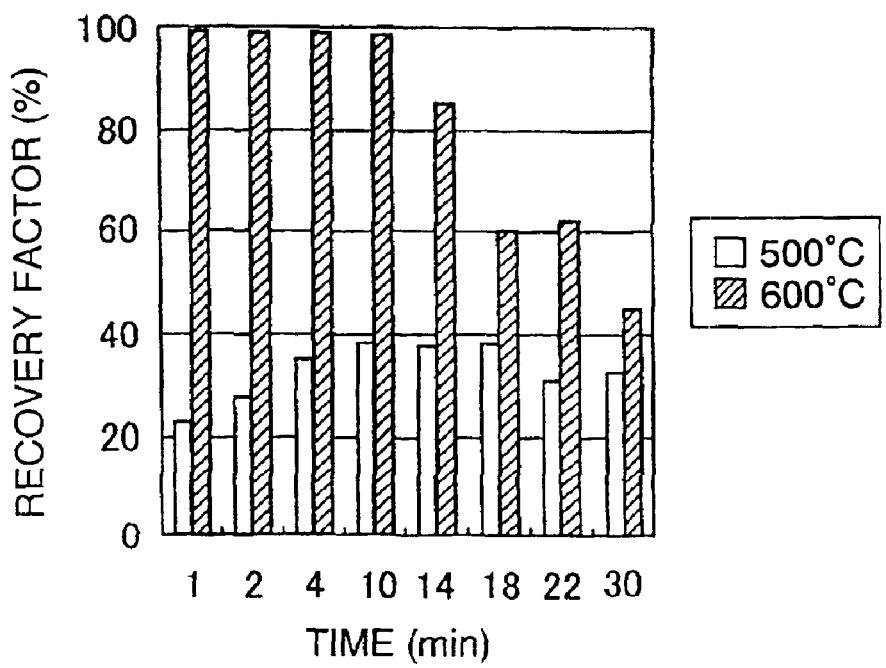
FIG. 11 is a graph showing the relationship between the recovery factor of the palladium type reforming catalyst and time of the recovery operation.

The catalyst temperature during the recovery operation in Example 2 was set at 500° C. or at 600° C., and time dependent change of the reforming rate was measured with the passage of time. The results were shown in FIG. 11.

The catalyst performance of both copper type and palladium type catalysts can be recovered by the recovery operation for less than ten minutes. When the time of the recovery operation exceeds 10 minutes, the recovery factor decreases due to the catalyst deterioration.

Example 6 and Comparative Example 1

Two similarly degraded palladium type catalyst samples were prepared by degrading their catalyst performances after conducting the same reforming operation under the same conditions as those of Example 2 for 300 hours. The methanol reforming rates of these degraded catalyst samples were measured by analyzing the oxidation-reduction states of these catalysts after being subjected to the following reforming operation 1 or 2.

Reforming operation 1 (Example 6): The catalyst sample was subjected to the recovery operation under the same conditions as that of example 2 for one minute and the catalyst sample was then cooled while flowing nitrogen.

Reforming operation 2 (Comparative Example 1): The catalyst sample was heated in an electric furnace at 600° C. in air for one minute and cooled in air to room temperature.

Analysis of the oxidation-reduction state of the catalyst samples: The oxidation-reduction state of palladium was analyzed by XPS (X-ray photoelectron spectroscopy). The content of the reduced Pd, whose valence is zero, was analyzed.

The methanol reforming rate: The reforming operation was started by an auto-thermal method by supplying a water-methanol fuel mixture under conditions of S/C (steam/carbon molar ratio)=1.5, an methanol LHSV=15, and an inlet gas temperature to the reforming catalyst of 180° C. Subsequently, the amount of air was regulated such that the inlet temperature reached 400° C. and after the temperature was stabilized, the reforming rate was measured.

Specification of the catalyst: The catalyst was carried by a catalyst amount of 200 g/l on a cordierite honeycomb with 400 cells having a size of 45 mm in diameter and a length of 20 mm.

The result of the analysis is shown in Table 1.

TABLE 1

|  | Degraded catalyst | Example 6 | Comparative Example 1 |
|---|---|---|---|
| Amount of Reduced Pd (wt %) | 62 | 77 | 60 |
| Methanol reforming rate (%) | 92.2 | 99.4 | 89 |

As shown in Table 1, the amount of reduced palladium was increased and recovery of the reforming rate of methanol was observed in the recovery operation (Example 6) executed under coexistence of the fuel and air. In contrast, recovery of the reforming rate was not observed by the high temperature recovery operation (Comparative Example 1) supplying only air. This results indicates that the reforming catalyst is not recovered by the oxidation reaction of air but is recovered by the reduction treatment when the reforming catalyst is exposed to the high temperature atmosphere with the fuel.

As described above, in the catalyst performance recovery method of the reforming catalyst device according to the present invention, the catalyst performance can be recovered by the high temperature reduction of the catalyst by the fuel since the catalyst is in contact with the fuel-air mixture at a high temperature between 500° C. and 800° C. Accordingly, it is possible to recover the catalyst performance without demounting the catalyst from the reforming catalyst device. In addition, it is possible to prolong elongate the service life of the reforming catalyst device. Since frequent replacement of the catalyst is not necessary for the catalyst in the reforming catalyst device of the present invention, the reforming catalyst device and the catalyst recovery method of the present invention are particularly advantageous and effective to be applied to the fuel cell system to be installed in the fuel cell vehicle.

Since the catalyst reforming device is provided with the detecting device for detecting information indicating the catalyst performance and with the control device for determining the catalyst performance based on the information of the detecting device and for controlling the supply amount of the fuel and air to the catalyst, it is possible to continuously monitor the catalyst performance and to recover the catalyst performance when the catalyst performance is deteriorated.

In the reforming catalyst apparatus of the present invention comprising the catalyst temperature detecting device and the control device for determining the catalyst performance based on the catalyst temperature, the catalyst performance can be determined from the time dependent change of the temperature and the catalyst performance can be automatically recovered when it is necessary.

In the reforming catalyst apparatus of the present invention comprising the reforming gas composition detecting device and the control device for determining the catalyst performance based on the reforming gas composition, the catalyst performance can be recovered automatically when it is necessary.

In the reforming catalyst apparatus of the present invention comprising the detecting device for detecting the reforming gas generated from the catalyst and for detecting the voltage generated by the fuel cell using the oxidant gas, it is possible to determine the degradation of the catalyst from the voltage generated by the fuel cell, and it is possible to automatically recover the catalyst performance when the control device determines the degradation of the catalyst performance.

Furthermore, since the control device of the present invention controls supply amounts of the fuel and air such that the catalyst temperature is raised to a temperature between 500° C. and 800° C. within ten minutes, the catalyst performance can be recovered within ten minutes.

What is claimed is:

1. A catalyst performance recovery method of a reforming catalyst apparatus provided with a reforming catalyst used for generating a hydrogen rich reformed gas by a reforming reaction between a fuel and water, comprising the steps of:
   stopping introduction of water to the catalyst; and
   recovering a performance of said catalyst by heating said reforming catalyst within a temperature range above 500° C. and below 800° C. while supplying said fuel and air and stopping supply of water to said reforming catalyst.

2. A catalyst performance recovery method of a reforming catalyst apparatus according to claim 1, wherein said reforming catalyst apparatus comprises:
   measuring devices for obtaining information indicating the performance of said reforming catalyst in said reforming catalyst apparatus; and
   a control device for controlling supply amounts of the fuel and the air based on a determination with respect to the catalyst performance obtained by information indicating said performance of said reforming catalyst.

3. A catalyst performance recovery method of a reforming catalyst apparatus according to claim 2, said method further comprising the steps of:
   measuring a catalyst temperature with one of said measuring devices; and
   determining with said control device whether the catalyst performance is deteriorated based on said catalyst temperature obtained by said measuring device.

4. A catalyst performance recovery method of a reforming catalyst apparatus according to claim 2, said method further comprising the steps of:
   measuring a composition of the reformed gas formed in said reforming catalyst apparatus with one of said measuring devices; and
   determining with said control device whether the catalyst performance is deteriorated based on said composition obtained by said measuring device.

5. A catalyst performance recovery method of a reforming catalyst apparatus according to claim 2, said method further comprising the steps of:
   measuring a generation voltage generated by a fuel cell using said reformed gas formed by said catalyst and an oxidant gas; and
   determining whether the catalyst performance is deteriorated based on said generation voltage obtained by a detecting device.

6. A catalyst performance recovery method of a reforming catalyst apparatus according to claim 5, wherein, when it is determined that said catalyst has deteriorated, said method further comprising the step of controlling with said control device supply amounts of the fuel and air such that the catalyst temperature is maintained at a temperature within a range above 500° C. and below 800° C. for less than 10 minutes, in order to recover the catalyst performance.

7. A catalyst performance recovery method of a reforming catalyst apparatus according to claim 2, wherein, when it is determined that said catalyst has been deteriorated, said method further comprising the step of controlling with said control device supply amounts of the fuel and air such that the catalyst temperature is maintained at a temperature within a range above 500° C. and below 800° C. for less than 10 minutes, in order to recover the catalyst performance.

8. A catalyst performance recovery method of a reforming catalyst apparatus according to claim 7, wherein, when a palladium catalyst is used as the reforming catalyst, said method further comprising the step of maintaining said catalyst temperature at a temperature within a range above 500° C. and below 800° C. for less than 10 minutes.

9. A catalyst performance recovery method of a reforming catalyst apparatus according to claim 7, wherein, when a copper catalyst is used as the reforming catalyst, said method further comprising the step of maintaining said catalyst temperature at a temperature within a range above 500° C. and below 800° C. for less than 10 minutes.

* * * * *